(12) United States Patent
Lee

(10) Patent No.: US 10,875,516 B2
(45) Date of Patent: Dec. 29, 2020

(54) ACTUATOR OF ELECTRONIC BRAKE SYSTEM

(71) Applicant: MANDO CORPORATION, Gyeonggi-do (KR)

(72) Inventor: Youngsong Lee, Gyeonggi-do (KR)

(73) Assignee: MANDO CORPORATION, Gyeonggi-do (KR)

( * ) Notice: Subject to any disclaimer, the term of this patent is extended or adjusted under 35 U.S.C. 154(b) by 112 days.

(21) Appl. No.: 16/143,465

(22) Filed: Sep. 27, 2018

(65) Prior Publication Data

US 2019/0100188 A1 Apr. 4, 2019

(30) Foreign Application Priority Data

Sep. 29, 2017 (KR) .................. 10-2017-0127799
Oct. 17, 2017 (KR) .................. 10-2017-0134332

(51) Int. Cl.
*B60T 13/74* (2006.01)
*B60T 11/10* (2006.01)
(Continued)

(52) U.S. Cl.
CPC ............ *B60T 13/745* (2013.01); *B60T 7/042* (2013.01); *B60T 8/4018* (2013.01);
(Continued)

(58) Field of Classification Search
CPC ...... B60T 7/042; B60T 8/4018; B60T 8/4081; B60T 11/102; B60T 11/165; B60T 13/662; B60T 13/686; B60T 13/745
See application file for complete search history.

(56) References Cited

U.S. PATENT DOCUMENTS 9,003,903 B2 * 4/2015 Drumm ................... F16H 25/20
74/89.23
2012/0160043 A1 * 6/2012 Drumm ................... H02K 7/06
74/89.23
(Continued)

FOREIGN PATENT DOCUMENTS

KR 10-2013-0087198 8/2013
KR 10-2013-0123785 11/2013
(Continued)

OTHER PUBLICATIONS

Office Action dated Sep. 12, 2018 for Korean Patent Application No. 10-2017-0134332 and its English machine translation by Google Translate.
(Continued)

*Primary Examiner* — Thomas W Irvin
(74) *Attorney, Agent, or Firm* — Ladas & Parry, LLP

(57) ABSTRACT

Disclosed is an actuator of an electronic brake system including: a motor having a stator and a rotor for generating a rotational force by an electrical signal, the rotor having an accommodating space therein; a power conversion unit disposed in the accommodating space, and including a spindle rotated by a rotational force of the rotor and a nut coupled to the spindle to be linearly moved by rotation of the spindle; a piston coupled to move with the nut; and a sleeve coupled to one end of the rotor by a bearing so that the rotor is relatively rotatable and having an inner space communicating with the accommodating space and accommodating the piston so as to be able to move forward and backward.

16 Claims, 9 Drawing Sheets

(51) Int. Cl.
  *B60T 7/04* (2006.01)
  *F16H 25/24* (2006.01)
  *B60T 11/16* (2006.01)
  *B60T 13/66* (2006.01)
  *B60T 8/40* (2006.01)
  *B60T 13/68* (2006.01)
  *F16H 25/20* (2006.01)

(52) U.S. Cl.
  CPC ........... *B60T 8/4081* (2013.01); *B60T 11/102* (2013.01); *B60T 11/165* (2013.01); *B60T 13/662* (2013.01); *B60T 13/686* (2013.01); *F16H 25/2454* (2013.01); *F16H 2025/2075* (2013.01)

(56) References Cited

U.S. PATENT DOCUMENTS

| | | | |
|---|---|---|---|
| 2018/0345934 A1* | 12/2018 | Weh | B60T 13/16 |
| 2019/0100172 A1* | 4/2019 | Lee | F16H 25/2015 |
| 2019/0100182 A1* | 4/2019 | Leiber | B60T 13/142 |
| 2020/0114894 A1* | 4/2020 | Leiber | B60T 8/3255 |

FOREIGN PATENT DOCUMENTS

| | | |
|---|---|---|
| KR | 10-2014-0037536 | 3/2014 |
| KR | 10-2016-0001681 | 1/2016 |
| KR | 10-2016-0123412 | 10/2016 |

OTHER PUBLICATIONS

Office Action dated Mar. 27, 2019 for Korean Patent Application No. 10-2017-0134332 and its English translation by Global Dossier.

\* cited by examiner

[Fig. 1]
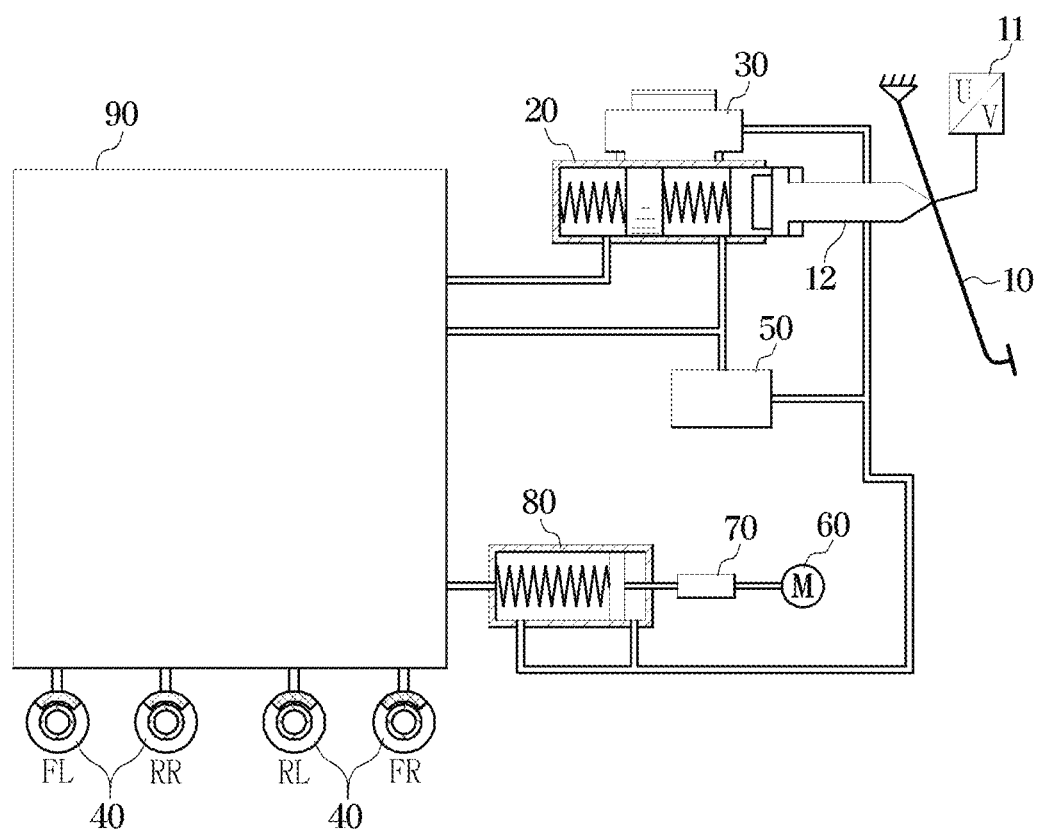

[Fig. 2]
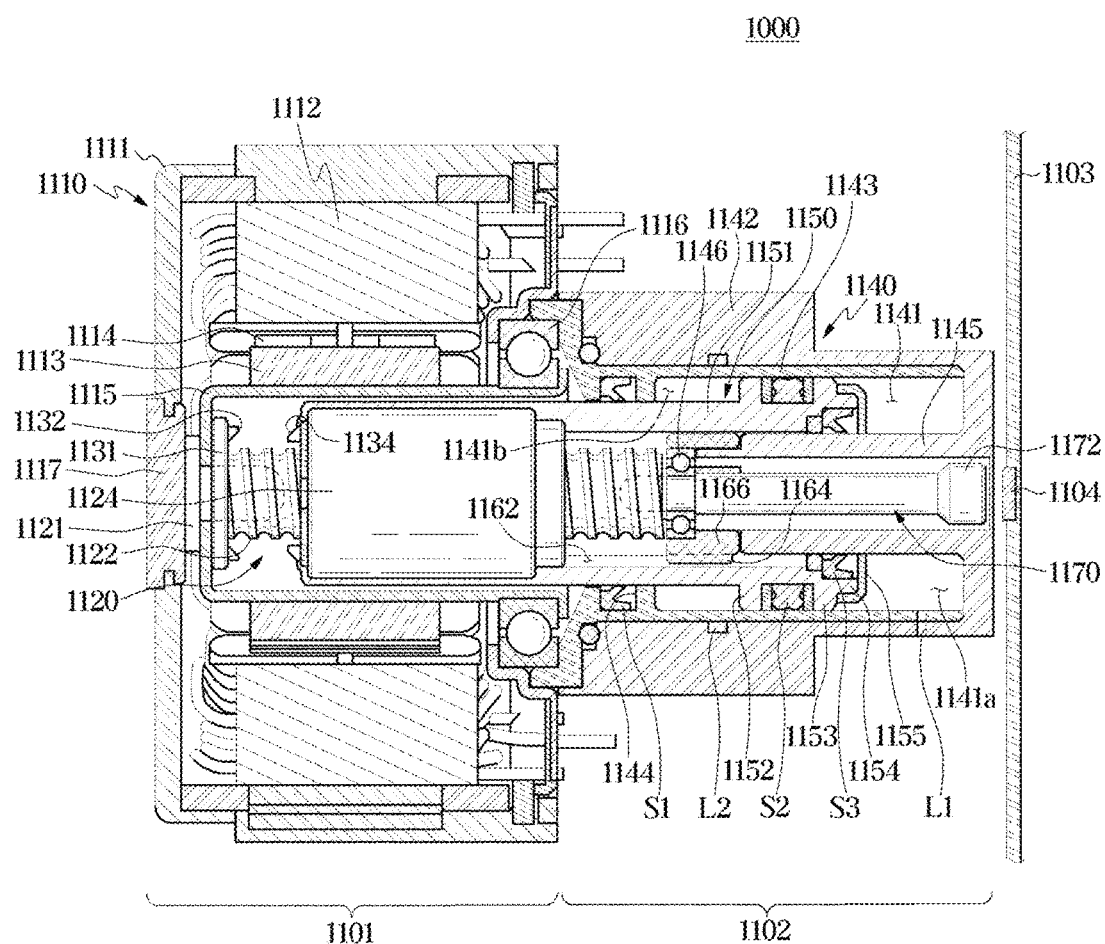

[Fig. 3]
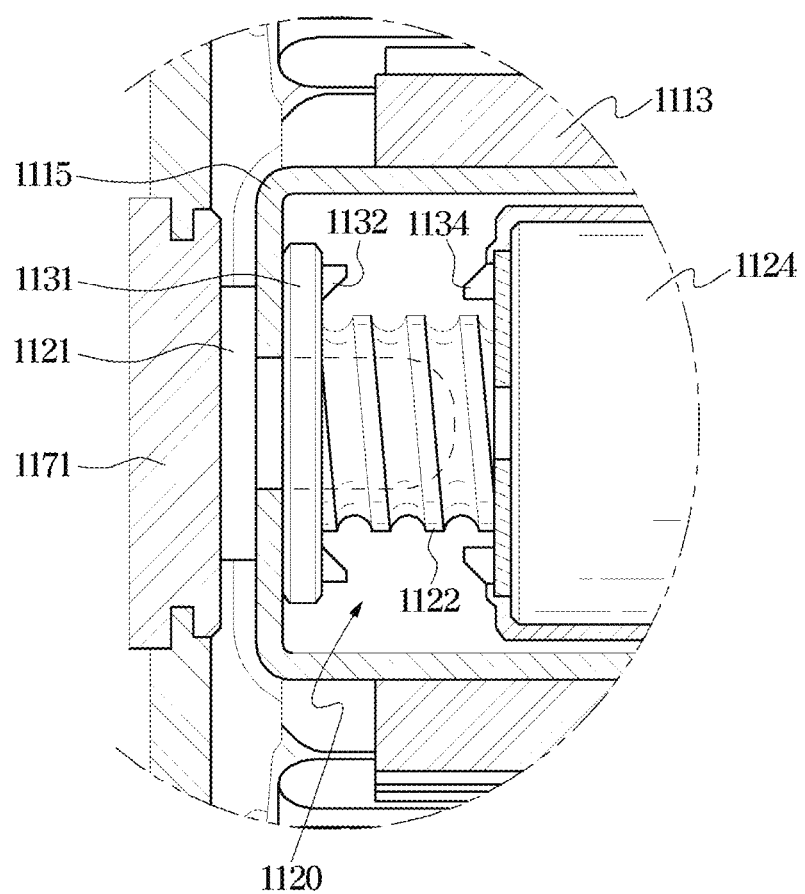

[Fig. 4]
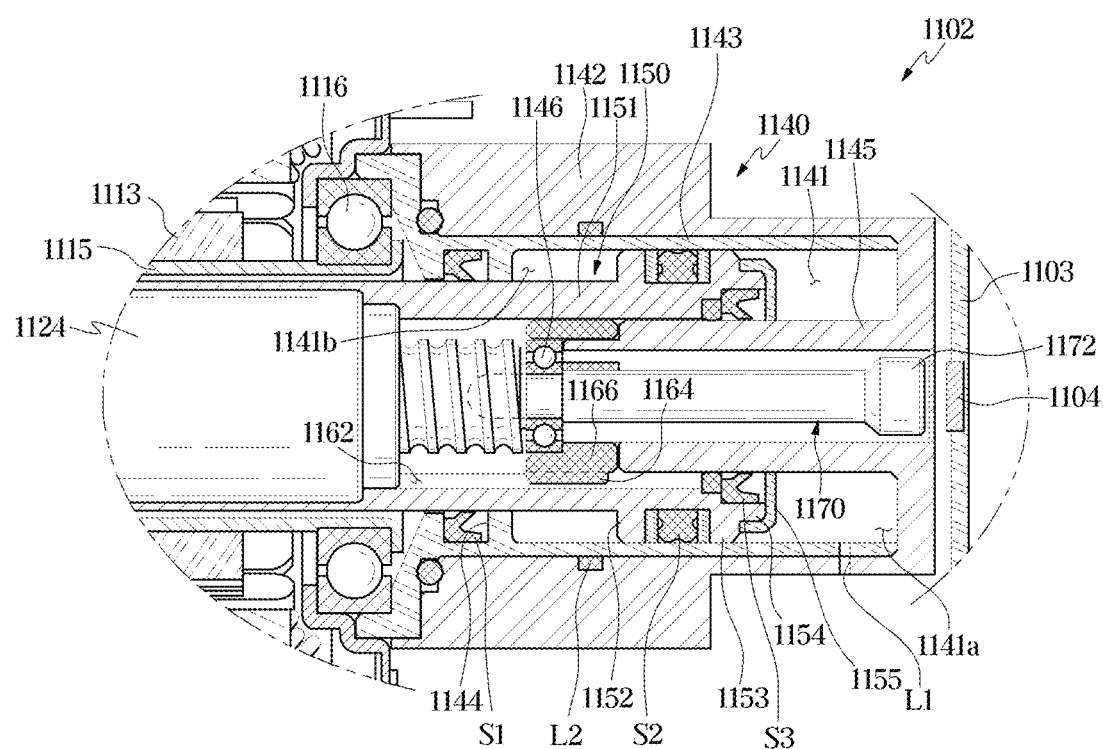

【Fig. 5】
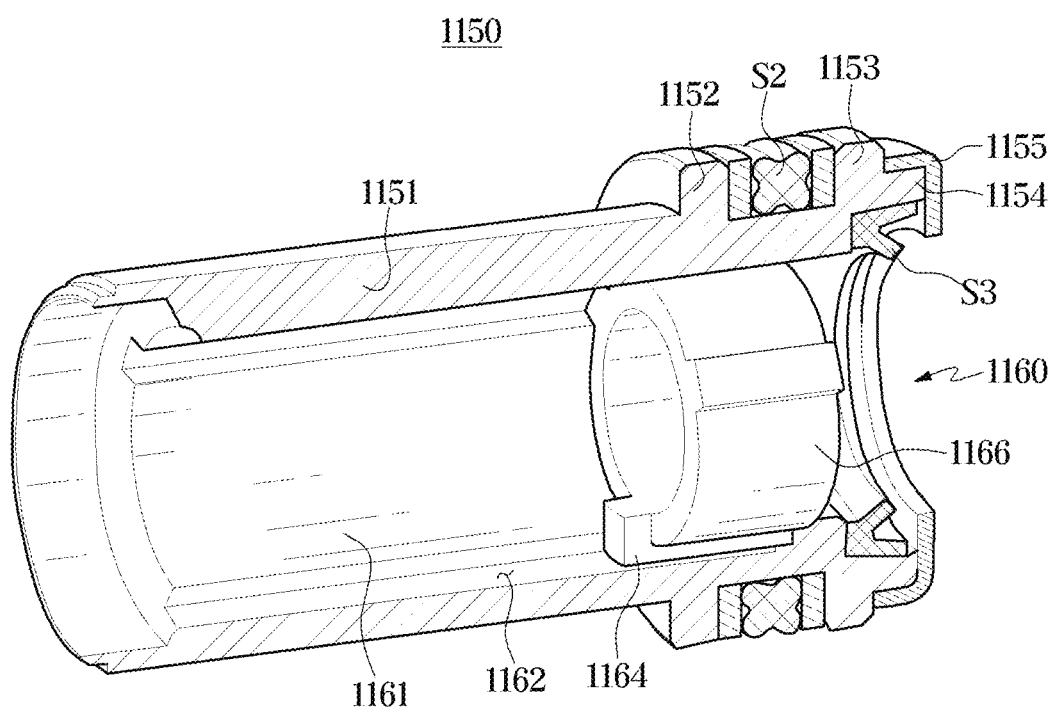

[Fig. 6]
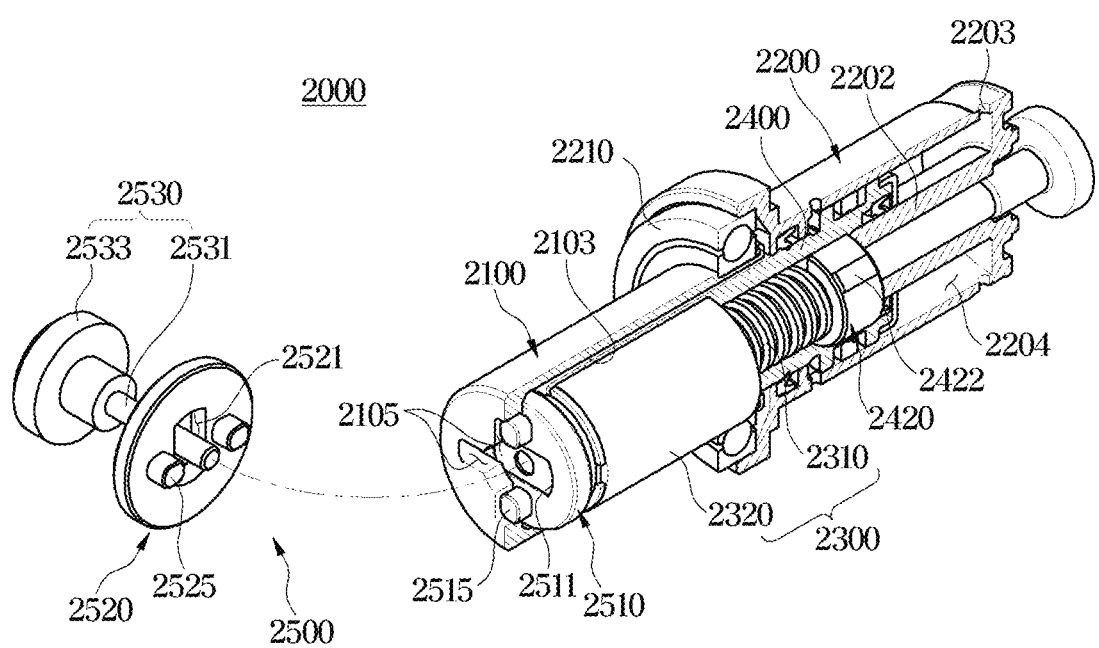

[ Fig. 7 ]
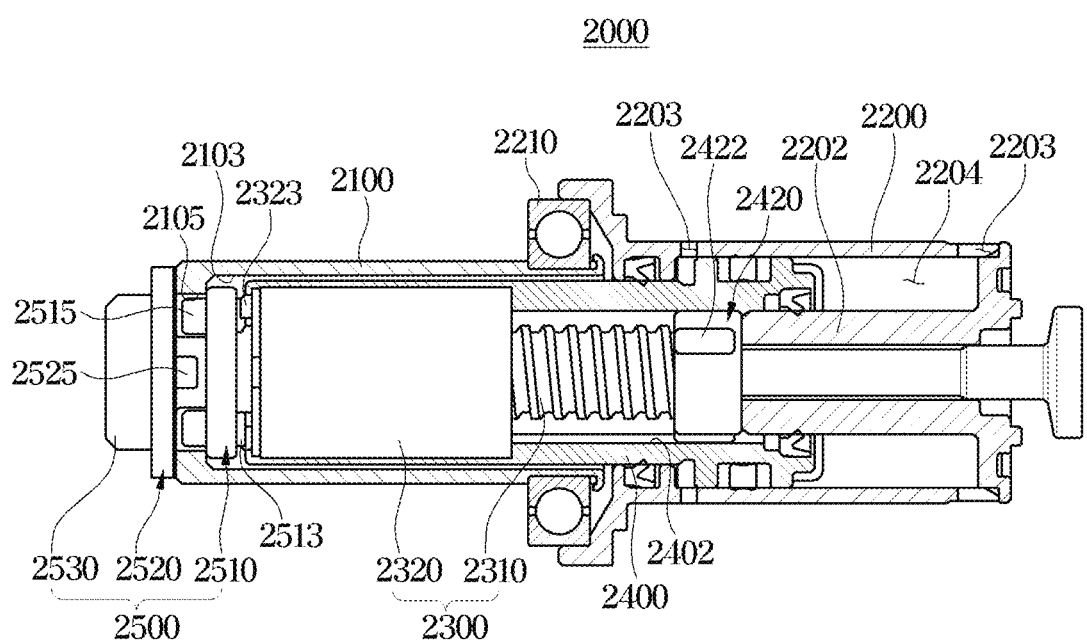

[Fig. 8]
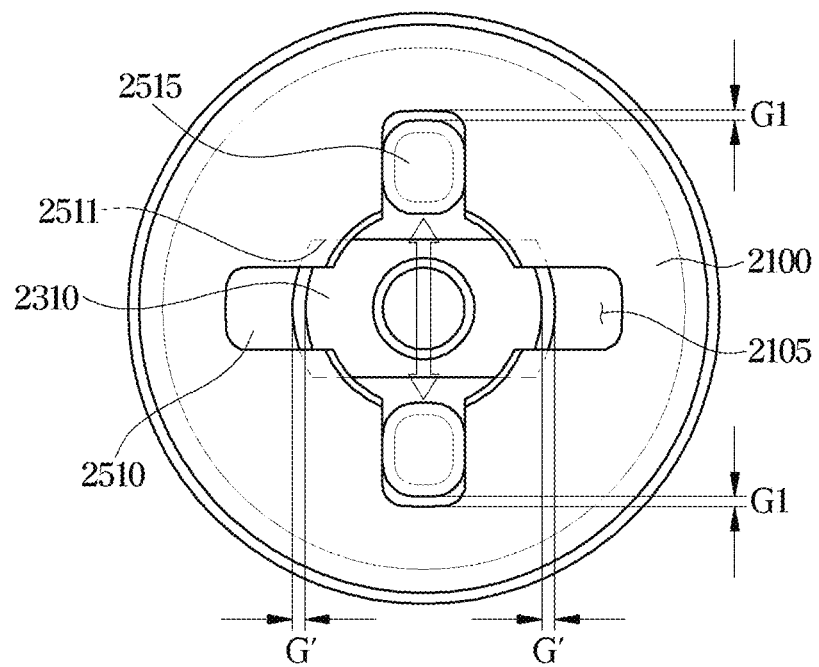

[Fig. 9]
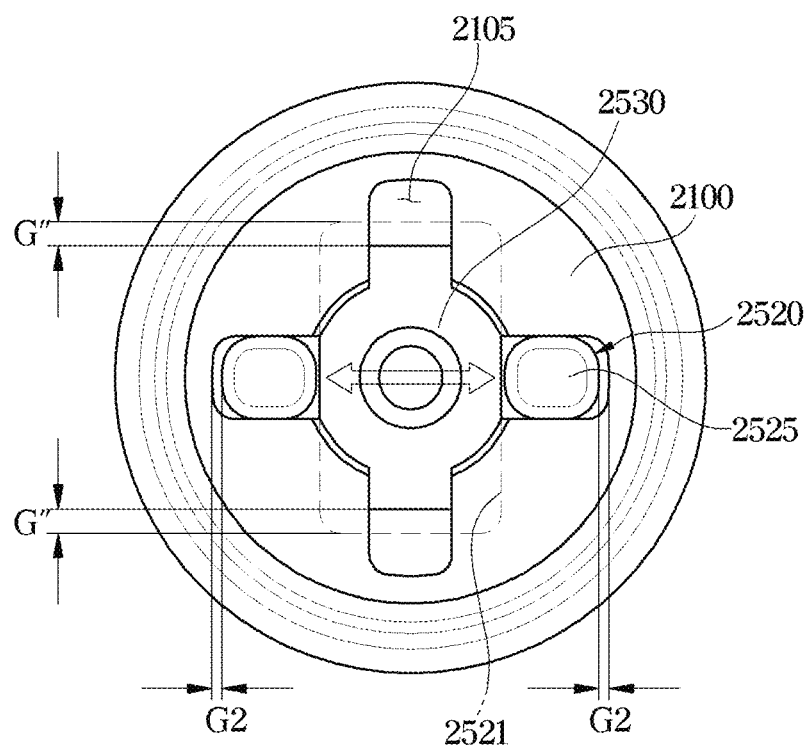

ACTUATOR OF ELECTRONIC BRAKE SYSTEM

CROSS-REFERENCE TO RELATED APPLICATION(S)

This application is based on and claims priority under 35 U.S.C. § 119 to Korean Patent Application No. 10-2017-0127799, filed on Sep. 29, 2017, and Korean Patent Application No. 10-2017-0134332, filed on Oct. 17, 2017 in the Korean Intellectual Property Office, the disclosures of which are incorporated by reference herein in their entireties.

BACKGROUND

1. Technical Field

The present disclosure relates to an electronic brake system, and more particularly, to an electronic brake system that generates a braking force using an electrical signal corresponding to a displacement of a brake pedal and an actuator used therefor.

2. Description of the Related Art

In general, a vehicle is essentially equipped with a brake system for braking, and in recent years, various types of brake systems have been proposed to obtain a more powerful and stable braking force.

For example, the brake system includes an anti-lock brake system (ABS) for preventing slippage of the wheels during braking, a brake traction control system (BTCS) for preventing the drive wheels from slipping when the vehicle suddenly starts or suddenly accelerates, an electronic stability control system (ESC) for stably maintaining the running state of the vehicle by controlling the brake hydraulic pressure by combining the anti-lock brake system and the traction control system, and the like.

In the conventional brake system, when the driver depresses the brake pedal, a hydraulic pressure necessary for braking is supplied to the wheel cylinder using a mechanically connected vacuum booster. However, in recent years, an electronic brake system including an actuator, which receives an electric signal of the driver's braking will from a pedal displacement sensor that senses displacement of the brake pedal when the driver depresses the brake pedal and supplies the hydraulic pressure required for braking to the wheel cylinder, is widely used. For example, an integrated dynamic brake (IDB) system has been proposed.

SUMMARY

It is an aspect of the present disclosure to provide an actuator of an electronic brake system capable of effectively generating braking pressure.

Further, it is an aspect of the present disclosure to provide an actuator of an electronic brake system capable of operating in a double-acting manner.

Further, it is an aspect of the present disclosure to provide an actuator of an electronic brake system capable of automatically maintaining a center by allowing a power conversion unit provided in the actuator to move up, down, left, and right by a certain gap.

Additional aspects of the present disclosure will be set forth in part in the description which follows and, in part, will be obvious from the description, or may be learned by practice of the disclosure.

In accordance with one aspect of the present disclosure, there may be provided an actuator of an electronic brake system including: a motor having a stator and a rotor for generating a rotational force by an electrical signal, the rotor having an accommodating space therein; a power conversion unit disposed in the accommodating space, and including a spindle rotated by a rotational force of the rotor and a nut coupled to the spindle to be linearly moved by rotation of the spindle; a piston coupled to move with the nut; and a sleeve coupled to one end of the rotor by a bearing so that the rotor is relatively rotatable and having an inner space communicating with the accommodating space and accommodating the piston so as to be able to move forward and backward.

Further, the actuator of an electronic brake system may further include a piston housing containing a fluid therein and having a pressure chamber enclosing a sleeve in which the piston is accommodated so as to be movable forward and backward, and the power conversion unit may be provided in a space formed by the accommodating space of the rotor and the pressure chamber.

Further, the power conversion unit may include a fixing pin coupled to the rotor and rotating together with the rotor, a spindle connected to the fixing pin and rotating together with the fixing pin, and a nut screwed to the spindle, and the nut is fixedly coupled to the piston.

Further, the actuator of an electronic brake system may further include a disk provided inside the accommodating space of the rotor, a first protrusion protruding from the disk, and a second protrusion provided on a rear side of the nut facing the disk, in order to prevent the rotation of the spindle and the nut from being locked.

Further, the actuator of an electronic brake system may further include a piston housing containing a fluid therein and having a pressure chamber enclosing a sleeve in which the piston is accommodated so as to be movable forward and backward, and the piston may include a piston rod coupled to the nut and slidably moving in the pressure chamber.

Further, the piston rod may include a rotation preventing unit, and the rotation preventing unit may include a cylindrical piston sleeve provided on an inner surface of the piston rod, at least one rail provided along a longitudinal direction on the piston sleeve, and a rotation preventing ring having at least one guide protrusion fitted to the at least one rail to move forward and backward along the longitudinal direction of the piston sleeve.

Further, the actuator of an electronic brake system may further include: a sensing magnet coupled to the power conversion unit and rotated together with the rotation of the motor; and a motor position sensor provided to be coaxially spaced apart from the sensing magnet and sense a rotational position of the motor based on rotation of the sensing magnet.

Further, the actuator of an electronic brake system may further include a piston housing containing a fluid therein and having a pressure chamber in which the piston is accommodated so as to be movable forward and backward, and the pressure chamber is divided into a first chamber and a second chamber by the piston.

Further, the rotor may be opened at one end and have a cross-shaped groove or a protrusion at the other end, and the actuator may further include a gap regulating unit coupling the spindle and the rotor through the cross-shaped groove or the protrusion of the rotor and allowing the power conversion unit to move up, down, left, and right by a certain gap.

Further, the gap regulating unit may include: a first regulating member coupled with upper and lower sides of the cross-shaped groove or the projection so as to be coupled with the spindle between the rotor and the power conversion unit and to be moved in the up-down direction by a certain gap but to be fixed in the left-right direction; a second regulating member coupled to left and right sides of the cross-shaped groove or the protrusion so as to be moved in the left-right direction by a certain gap but to be fixed in the up-down direction; and a fastening bolt coupled to the spindle by passing through the first regulating member and the second regulating member.

Further, a coupling hole through which the spindle is coupled may be formed in the center of the first regulating member, and the coupling hole may have a predetermined length in the left-right direction and is formed in a non-circular shape.

Further, a clearance may be formed in the left-right direction between the coupling hole and the spindle.

Further, a first protrusion or a first groove may be formed on upper and lower sides with respect to the center of the first regulating member so as to be engaged with the cross-shaped groove or the protrusion, and a clearance may be formed in the up-down direction between the first protrusion or the first groove and the cross-shaped groove or the protrusion.

Further, a through hole through which the fastening bolt passes may be formed in the center of the second regulating member, and the through hole may have a predetermined length in the up-down direction and is formed in a non-circular shape.

Further, a clearance may be formed in the up-down direction between the through hole and the fastening bolt.

Further, a second protrusion or a second groove may be formed on left and right sides with respect to the center of the second regulating member so as to be engaged with the cross-shaped groove or the protrusion, and a clearance may be formed in the left-right direction between the second protrusion or the second groove and the cross-shaped groove or the protrusion.

Further, a groove or a protrusion may be formed on an inner circumferential surface of the piston in a longitudinal direction, and the actuator may further include a rotation preventing unit installed inside the sleeve and having a protrusion or a groove corresponding to the groove or the protrusion.

BRIEF DESCRIPTION OF THE DRAWINGS

The present disclosure will be described in detail with reference to the following drawings, which illustrate preferred embodiments of the present disclosure, and thus the technical idea of the present disclosure should not be construed as being limited thereto.

FIG. 1 is a schematic view of an electronic brake system including an actuator according to an embodiment of the present disclosure.

FIG. 2 illustrates an actuator of an electronic brake system according to an embodiment of the present disclosure.

FIG. 3 is an enlarged view for explaining a lock preventing unit of an actuator in an electronic brake system according to an embodiment of the present disclosure.

FIG. 4 is a cut perspective view of a piston unit of an actuator in an electronic brake system according to an embodiment of the present disclosure.

FIG. 5 is an enlarged view for explaining a piston unit of an actuator in an electronic brake system according to an embodiment of the present disclosure.

FIG. 6 is a partially exploded perspective view of an actuator of an electronic brake system according to another embodiment of the present disclosure.

FIG. 7 is a side cross-sectional view of an actuator of an electronic brake system according to another embodiment of the present disclosure.

FIG. 8 is a view illustrating a state where a first regulating member of a gap regulating unit provided in an actuator of an electronic brake system according to another embodiment of the present disclosure is coupled to a rotor.

FIG. 9 is a view illustrating a state where a second regulating member of a gap regulating unit provided in an actuator of an electronic brake system according to another embodiment of the present disclosure is coupled to a rotor.

DETAILED DESCRIPTION

Hereinafter, embodiments of the present disclosure will be described in detail with reference to the accompanying drawings. The embodiments described below are provided by way of example so that those skilled in the art can fully understand the spirit of the present disclosure. The present disclosure is not limited to the embodiments described below, but may be embodied in other forms. In order to clearly illustrate the present disclosure, parts not related to the description are omitted from the drawings. In the drawings, the width, length, thickness, etc. of components may be exaggerated for convenience. Like reference numerals designate like elements throughout the specification.

Before describing an actuator according to an embodiment of the present disclosure, an electronic brake system will be briefly described first with reference to FIG. 1.

FIG. 1 schematically illustrates an electronic electric brake system of a vehicle. As shown in FIG. 1, the electronic electric brake system of a vehicle may include a master cylinder 20, a reservoir 30, wheel cylinders (FR, FL, RR, and RL) 40, a pedal simulator 50, a motor 60, a power transmission unit 70, a pump 80, and a hydraulic circuit unit 90 for controlling the above components.

The master cylinder 20 performs a function to generate a hydraulic pressure by being pressurized by an input rod 12 when a driver operates the brake pedal 10, and the generated hydraulic pressure is transmitted to the pedal simulator 50. The pedal simulator 50 transmits a reaction force corresponding to the generated hydraulic pressure to the brake pedal 10 via the master cylinder 20 again so that the driver feels the pedal feeling. If the braking is not normally performed, the hydraulic pressure in the master cylinder 20 is directly transmitted to the wheel cylinders 40 so that the vehicle may be subjected to emergency braking.

On the other hand, in the normal braking state, the pump 80 transmits the hydraulic pressure to the wheel cylinders 40. Specifically, when the driver depresses the brake pedal 10, a pedal displacement sensor 11 detects a displacement of the brake pedal 10 and transmits it to an electronic control unit (ECU) 1103 (refer to FIG. 2), and the electronic control unit 1103 drives the motor 60 based on the displacement of the brake pedal 10. The rotational motion generated by the motor 60 is converted into a linear reciprocating motion by the power transmission unit 70 to press a piston in the pump 80, and the piston moves a fluid contained in a chamber of the pump 80 toward the wheel cylinders 40 to generate a braking force.

The reservoir 30, which is a means for storing a fluid, is provided to communicate with the master cylinder 20, the wheel cylinders 40, the pedal simulator 50, and the pump 80.

The hydraulic circuit unit 90 includes flow passages (not shown) for transferring the fluid between the master cylinder 20, the pump 80 and the wheel cylinders 40 and a plurality of valves (not shown) for interrupting the fluid flow in the flow passages. The arrangement of each component and the operation of controlling the components by the electronic control unit are well known in the art of vehicle braking, and thus detailed description thereof will be omitted.

An actuator 1000 (refer to FIG. 2) according to the electronic electric brake system of the present embodiment includes the motor 60 and the power transmission unit 70 described above.

FIG. 2 is a cross-sectional view of an actuator of an electronic brake system according to an embodiment of the present disclosure.

Referring to FIG. 2, the actuator 1000 according to the present embodiment includes a drive unit 1101 that generates power and a piston unit 1102 that is operated by the power of the drive unit 1101 to generate a hydraulic pressure, which may be effectively controlled by the electronic control unit 1103.

The drive unit 1101 generates power by an electric signal of the pedal displacement sensor 11 provided on the brake pedal 10, and the piston unit 1102 provides a braking pressure to the wheel cylinders (FR, FL, RR, and RL) 40 using the hydraulic pressure generated by advancing and retreating the piston by the power of the drive unit 1101.

The electronic control unit 1103 may include a printed circuit board (not shown) on which electronic elements for controlling the drive unit 1101, solenoid valves and the like are mounted. For reference, the pedal displacement sensor 11 detects a displacement of the brake pedal 10 and transmits an electric signal to the electronic control unit 1103, and the electronic control unit 1103 analyzes the signal of the pedal displacement sensor 11 to calculate the braking pressure required by the driver and outputs signals for controlling the drive unit 1101, the piston unit 1102, and various valves so as to satisfy the driver's requested braking pressure.

More specifically, the drive unit 1101 includes a motor 1110 that generates a rotational force with the supply of power. The motor 1110 is a device for generating a rotational force by a signal output from the electronic control unit 1103 and may generate a rotational force in a forward direction or a reverse direction. The rotational angular velocity and rotational angle of the motor 1110 may be precisely controlled.

The motor 1110 includes a stator 1112 and a rotor 1113. The stator 1112 is fixed to a motor housing 1111 and is provided in a ring or donut shape to form a first hollow portion therein. The rotor 1113 is disposed inside the first hollow portion of the stator 1112 and forms a cylindrical second hollow portion (an accommodating space) therein as in the stator 1112.

The drive unit 1101 may also include at least one magnetic body 1114 for generating a rotational force to the motor 1110, and the magnetic body 1114 is disposed on an outer circumferential surface of the rotor 1113 and may rotate together with the rotor 1113.

A hollow cylinder 1115 is provided in the second hollow portion provided inside the rotor 1113. The hollow cylinder 1115 is provided in the form of a cup having one side opened, and may share an internal space with a pressure chamber 1141 of the piston unit 1102 which will be described later. A gap is formed between the stator 1112 and the magnetic body 1114 so that the rotor 1113 may rotate without interfering with the stator 1112 when the motor 1110 is driven.

The drive unit 1101 may further include a ball bearing 1116 interposed between the motor housing 1111 and the rotor 1113. That is, the ball bearing 1116 is interposed between the motor housing 1111 provided with the stator 1112 and the hollow cylinder 1115 of the rotor 1113 to guide the rotation of the rotor 1113.

The drive unit 1101 may also include the power conversion unit 1120 that converts a rotational motion of the motor 1110 into a linear motion and transmits the linear motion to a piston 1150 of the piston unit 1102. The power conversion unit 1120 is installed in a cylindrical space formed by the hollow cylinder 1115 of the drive unit 1101 and a bore chamber of the piston unit 1102.

The power conversion unit 1120 may include a fixing pin 1121 coupled to the rotor 1113 to rotate together with the rotor 1113, a spindle 1122 connected to the fixing pin 1121 to rotate together with the fixing pin 1121, and a nut 1124 screwed to the spindle 1122.

As described above, the rotor 1113 includes the hollow cylinder 1115 therein, and the fixing pin 1121 is coupled to the one closed end surface of the hollow cylinder 1115 and rotates together with the rotor 1113. A protective cap 1117 may be provided on an outer wall of the motor housing 1111 opposite to the fixing pin 1121 so that the fixing pin 1121 may be rotatably supported from a rear side thereof. The fixing pin 1121 of the power conversion unit 1120 may be easily assembled and disassembled from the outside through the attachment and detachment of the protective cap 1117.

Screw threads are formed on an outer circumferential surface of the spindle 1122, and one side of the spindle 1122 is fixedly coupled to the hollow cylinder 1115, that is, the rotor 1113, by a fixing pin 1121.

The nut 1124 may has a hollow portion therein to allow the spindle 1122 to pass therethrough, and screw grooves may be formed on an inner circumferential surface of the hollow portion so as to be engaged with the screw threads of the spindle 1122. The spindle 1122 and the nut 1124 may be coupled in a ball-screw coupling manner in which rolling balls are interposed between the screw threads and the screw grooves to facilitate mutual screw movement. Since the nut 1124 may be moved forward and backward while its rotation is restricted by the piston 1150 provided in the piston unit 1102, which will be described later, the rotational motion of the spindle 1122 may be converted into a linear reciprocating motion by the nut 1124.

FIG. 3 is an enlarged view of a part of the actuator of the electronic brake system according to the present embodiment. The actuator 1000 may include a lock preventing unit 1130 for preventing the nut 1124 of the power conversion unit 1120 from excessively retreated to lock the rotation of the nut-screw during operation of the motor 1110.

The lock preventing unit 1130 includes a disk 1131 provided inside the hollow cylinder 1115, a first protrusion 1132 provided to protrude from the disk 1131, and a second protrusion 1134 provided at the rear of the nut 1124.

The disk 1131 may be tightly coupled to the inner wall of the hollow cylinder 1115 by the fixing pin 1121, and the first protrusion 1132 and the second protrusion 1134 are all provided in the form of embossing protrusions so as to be mutually engaged in the rotating direction. Through this protrusion structure, when the nut 1124 is retreated to a maximal rear end, it may be effectively prevented that an inner wall of the hollow cylinder 1115 and a rear flat surface of the nut 1124 come into close contact with each other by the complete contact. In the present embodiment, the second protrusion 1134 is illustrated as being provided on the nut 1124. However, the second protrusion 1134 is not limited thereto, but may be provided on the piston unit 1102, which will be described later.

The piston unit 1102 includes a piston housing 1140 having the pressure chamber 1141 formed therein, and the piston 1150 coupled to the nut 1124 of the power conversion unit 1120 and reciprocating linearly in the pressure chamber 141.

The piston housing 1140 may be assembled to one side of the motor 1110, and the pressure chamber 1141 may be provided in parallel with the hollow cylinder 1115 of the drive unit 1101 when coupled to the motor housing 1111. Accordingly, the piston 1150, which operates with the nut 1124 during the rotation of the motor 1110, may reciprocate linearly in a direction parallel to a rotation axis of the motor 1110.

The piston housing 1140 includes a metal sleeve 1143 that surrounds the pressure chamber 1141 from the inside of the pressure chamber 1141 so as to stably guide the piston 1150 forward and backward, and a cylinder block 1145 provided to protrude inward from the outside toward the drive unit 1101 from a center of the pressure chamber 1141. Since the sleeve 1143 and the cylinder block 1145 are provided in a circular shape having different diameters, the cylinder block 1145 is accommodated in the sleeve 1143 in a state of being spaced from each other, and the piston 1150 is slidably provided between the sleeve 1143 and the cylinder block 1145. The sleeve 1143, the cylinder block 1145, and the piston 1150 are provided coaxially with the center of rotation of the motor 1110.

The sleeve 1143 is coupled to the inner wall of the piston housing 1140 forming the pressure chamber 1141. Specifically, one end of the sleeve 1143 is installed inside a main body 1142 of the piston housing 1140 between the motor housing 1111 and the main body 1142 with the ball bearing 1116 interposed therebetween, and the other end of the sleeve 1143 is provided to extend outwardly of the main body 1142 along the pressure chamber 1141. The sleeve 1143 is also coupled to one end of the rotor 1113 by the ball bearing 1116 so that the rotor 1113 is rotatable relative to the sleeve 1143. The piston 1150 is accommodated movably in a cylindrical interior of the sleeve 1143 that communicates with the hollow cylinder 1115 of the rotor 1113.

The sleeve 1143 also includes a first seal portion 1144 in which a first sealing member S1 is provided to prevent a fluid contained in the pressure chamber 1141 from escaping. The first seal portion 1144 may be formed by protruding a part of the sleeve 1143 toward the piston 1150 so as to accommodate the first sealing member S1 therein. An excessive retreat of the piston 1150 may be prevented as a piston head 1152 having a larger diameter than a piston rod 1151 is caught by the first seal portion 1144 during the forward and backward movement of the piston 1150.

The cylinder block 1145 is provided in the piston housing 1140 in the form of a cylinder having a hollow inside and is provided to extend inward toward the rotational axis direction of the motor 1110. The outer circumferential surface of the cylinder block 1145 is slidably engaged with the inside of the piston 1150. A sensing magnet holder is provided in the inner hollow of the cylinder block 1145 to extend in a longitudinal direction from the spindle 1122 of the power conversion unit 1120 to detect a rotational position of the motor 1110. An end of the cylinder block 1145 is disposed to face the spindle 1122 of the power conversion unit 1120 with a ball bearing 1146 interposed therebetween. Details of this will be described later.

The piston 1150 moves forward and backward in the pressure chamber 1141 of the piston housing 1140 in which the fluid is contained by the driving of the motor 1110 to generate a hydraulic pressure necessary for braking. To this end, the piston 1150 includes the piston rod 1151 and the piston head 112 which are coupled to the nut 1124 and slidably move in the pressure chamber 1141.

The piston rod 1151 has an inner hollow and the nut 1124 of the power conversion unit 1120 is fixedly coupled to one side thereof and the cylinder block 1145 of the piston housing 1140 is slidably coupled to the other side thereof. The piston head 1152 having an outer diameter larger than that of the piston rod 1151 is disposed at one side of the piston rod 1151 in the pressure chamber 1141.

The piston head 1152 includes a second seal portion 1153 provided with a second sealing member S2 for preventing the fluid contained in the pressure chamber 1141 from escaping. The second seal portion 1153 may be formed to accommodate the second sealing member S2 by recessing a part of the piston head 1152 inward.

The piston head 1152 also includes a third seal portion 1154 provided with a third sealing member S3 for preventing the fluid contained in the pressure chamber 1141 from escaping between the sliding surfaces with the cylinder block 1145. The third seal portion 1154 may be formed to accommodate the third sealing member S3 by recessing the end of the piston head 1152 on the cylinder block side inward. The third sealing member S3 is provided in the shape of a cup seal, and a sealing cap 1155 may be provided to prevent the third sealing member S3 from escaping. As described above, an excessive retreat of the piston 1150 may be prevented as the piston head 1152 is caught by the first seal portion 1144 of the sleeve 1143 provided with the first sealing member S1 during the backward movement of the piston 1150.

FIG. 5 is a cut perspective view of a piston of an actuator according to an embodiment of the present disclosure. Referring to FIG. 5, the piston 1150 according to an embodiment of the present disclosure includes a rotation preventing unit 1160 for preventing the nut 1124 of the power conversion unit 1120 provided inside the piston 1150 from rotating with the spindle 1122.

The rotation preventing unit 1160 includes a cylindrical piston sleeve 1161 provided on the inner surface of the piston 1150, at least one rail 1162 provided along a longitudinal direction on the piston sleeve 1161, and a rotation preventing ring 1166 having at least one guide protrusion 1164 fitted in the at least one rail 1162 to move forward and backward along the longitudinal direction of the piston sleeve 1161.

One end of the piston sleeve 1161 is provided in a multi-step manner so that an end portion of the nut 1124 of the power conversion unit 1120 is tightly coupled thereto and the other end of the piston sleeve 1161 is accommodated in the piston 1150.

In this embodiment, three of the rails 1162 and three of the guide protrusions 1164 are provided at intervals of 120 degrees in the longitudinal direction of the piston sleeve 1161 and on the outer circumferential surface of the rotation preventing ring 1166, respectively, but the present disclosure is not limited thereto, and at least two or more may be provided for smooth movement.

The guide protrusions 1164 provided on the outer circumferential surface of the rotation preventing ring 1166 are slidably engaged with the rails 1162 of the piston sleeve 1161, and the inner hollow of the rotation preventing ring 1166 is coupled to an end of the cylinder block 1145 through the ball bearing 1146 interposed therebetween. That is, in the thickness direction of the rotation preventing ring 1166, the spindle 1122 of the power conversion unit 1120 is rotatably assembled to one side of the rotation preventing ring 1166 through the ball bearing 1146 interposed therebetween, and the cylinder block 1145 is assembled to the other side of the rotation preventing ring 1166 in a state of being spaced apart. Accordingly, when the motor 1110 is driven, the spindle 1122 rotates, but the rotation preventing ring 1166 does not rotate.

As shown in FIG. 4, a sensing magnet holder 1170 having one end coupled to the spindle 1122 is coupled to the inner hollow of the rotation prevention ring 1166, for example, the inner circumferential surface of the ball bearing 1146 in the inner hollow of the cylinder block 1145.

The sensing magnet holder 1170 rotates together with the spindle 1122 of the power conversion unit 1120 when the spindle 1122 rotates.

A sensing magnet 1172 may be provided on the other end of the sensing magnet holder 1170, that is, on the end of the sensing magnet holder 1170 adjacent to the electronic control unit 1103. A motor position sensor 1104 mounted on the electronic control unit 103 may detect a rotational position of the motor 1110, for example, a rotational direction and a RPM based on the magnetic flux change caused by the rotation of the sensing magnet 1172 spaced apart from the motor position sensor 1104. The motor position sensor 1104 is mounted on the printed circuit board disposed in the electronic control unit 1103. The motor position sensor 1104 may be disposed at a position corresponding to the sensing magnet 1172, that is, at a position where a rotation axis of the sensing magnet 1172 coincides with a center of the motor position sensor 1104 in order to further improve the detection capability of the motor position sensor 1104.

On the other hand, according to this embodiment, the piston unit 1102 may be provided as a double acting type piston. That is, the pressure chamber 141 in which the fluid is contained may be partitioned by the piston 1150 to be divided into a first chamber 1141a positioned at front of the piston 1150 and a second chamber 1141b positioned at the rear of the piston 1150.

The first chamber 1141a and the second chamber 1141b may be connected to at least one or more of the wheel cylinders (FR, FL, RR, and RL) 40 (refer to FIG. 1) to provide a hydraulic pressure. For example, as the piston 1150 moves forward, the hydraulic pressure formed in the first chamber 1141a may be transmitted to at least one or more of the wheel cylinders (FR, FL, RR, and RL) 40 through a first hydraulic passage L1, and as the piston 1150 moves backward, the hydraulic pressure formed in the second chamber 1141b may be transmitted to at least one or more of the wheel cylinders (FR, FL, RR, and RL) 40 through a second hydraulic passage L2.

Also, the first and second chambers 1141a and 1141b may be connected to the wheel cylinders (FR, FL, RR, and RL) 40, respectively, to remove a hydraulic pressure. For example, the braking fluid in the wheel cylinders (FR, FL, RR, and RL) 40 may be introduced into the first chamber 1141a through the first hydraulic passage L1 by a negative pressure formed in the first chamber 1141a as the piston 1150 moves backward, and the braking fluid in the wheel cylinders (FR, FL, RR, and RL) 40 may be introduced into the second chamber 1141b through the second hydraulic passage L2 by a negative pressure formed in the second chamber 1141b as the piston 1150 moves forward.

On the other hand, when the piston 1150 moves forward, a hydraulic pressure may be generated in the first chamber 1141a or a negative pressure may be generated in the second chamber 1141b. Conversely, when the piston 1150 moves backward, a negative pressure may be generated in the first chamber 1141a or a hydraulic pressure may be generated in the second chamber 1141b. At this time, whether to apply the braking pressure to the wheel cylinders (FR, FL, RR, and RL) 40 using the hydraulic pressure in the chamber or whether to release the braking pressure using the negative pressure in the chamber may be determined by the control of the valves by the electronic control unit 1103.

The first chamber 1141a is partitioned by the piston housing 1140 and the front end of the piston 1150 and is provided to vary its volume according to the movement of the piston 1150. Likewise, the second chamber 1141b is partitioned by the piston housing 1140 and the rear end of the piston 1150 and is provided to vary its volume according to the movement of the piston 1150.

In addition, the piston 1150 may be provided such that a first effective area for forming the hydraulic pressure in the first chamber 1141a is larger than a second effective area for forming the hydraulic pressure in the second chamber 1141b.

FIG. 6 is a partially exploded perspective view of an actuator of an electronic brake system according to another embodiment of the present disclosure, and FIG. 7 is a side cross-sectional view of the actuator shown in FIG. 7.

Referring to FIGS. 6 and 7, an actuator 2000 according to this embodiment is an apparatus that operates to convert the rotational force of a motor into a linear motion. As an example, the actuator 2000 may be installed in an electronic brake system and used as an apparatus for generating a hydraulic pressure. For example, the actuator 2000 is provided in an IDB system and is configured to output the operation of the brake pedal by the driver as an electric signal to operate a motor, and convert the rotational force of the motor into linear motion to press a piston, thereby generating a hydraulic pressure for braking. Since the IDB system is a publicly known technology, a detailed description thereof will be omitted.

The actuator 2000 includes a motor including a rotor 2100 and a stator (not shown), a power conversion unit 2300 for converting a rotational force into a linear motion, a piston 2400 coupled to the power conversion unit 2300, a sleeve 2200 that is pressurized by the piston 2400 to generate hydraulic pressure, and a gap regulating unit 2500 for coupling the rotor 2100 and the power conversion unit 2300 and allowing the movement of the power conversion unit 2300 in the up, down, left, and right directions by a certain gap.

The motor operates through an electrical signal of the displacement sensor (11 in FIG. 1) that detects a displacement in accordance with the pedal effect of the brake pedal. That is, the motor rotates forward and backward to generate a rotational force in order to generate a braking force required by the driver. Such a motor may be a hollow motor having the rotor 2100 and the stator (not shown). Although only the rotor 2100 of the motor is shown in FIG. 6, a stator may be provided to enclose the rotor 2100 as in the embodiment of FIG. 2. That is, when the coil is wound on the stator and power is applied, a repulsive force and a pulling force are applied between a magnet (not shown) and the coil installed in the rotor 2100 so that the rotor 2100 may be rotated.

The rotor 2100 has a cylindrical shape such that an accommodating space 2103 is formed in a longitudinal direction. One end of the rotor 2100 is opened and a cross-shaped groove 2105 is formed at the other end of the rotor 2100. The cross-shaped groove 2105 formed at the other end of the rotor 2100 may be formed as a cross-shaped projection.

The power conversion unit 2300 is disposed in the accommodating space 2103 of the rotor 2100. A spindle 2310 of the power conversion unit 2300 is coupled to the other end of the rotor 2100 through the gap regulating unit 2500 and rotated together with the rotor 2100.

The sleeve 2200 is coupled to one end of the rotor 2100 as described above. The sleeve 2200 has a cylindrical shape such that the inside thereof communicates with the accommodating space 2103 in a straight line. In this case, the sleeve 2200 is coupled to the rotor 2100 by a ball bearing 2210 so that the rotor 2100 is rotatable. The inside of the sleeve 2200 is configured as a pressure chamber 2204, and the piston 2400 is accommodated in the inside of the sleeve 2200 so as to be movable forward and backward. Accordingly, as the piston 2400 advances and retreats, the pressure chamber 2204 is pressurized to generate a hydraulic pressure. Further, a guide wall 2202 may be formed at an inner central portion of the sleeve 2200. The guide wall 2202 serves to guide the piston 2400 when the piston 2400 moves forward and backward. Reference numeral '2203' denotes a hydraulic hole into which the hydraulic pressure is introduced into and discharged from the pressure chamber 2204 as the piston 2400 advances and retreats.

The power conversion unit 2300 includes the spindle 2310 disposed in the accommodating space 2103 of the hollow rotor 2100, and a nut 2320 engaged with the spindle 2310 and linearly moving in accordance with rotation of the spindle 2310. In this case, although not shown, the power conversion unit 2300 may be of a ball-screw type having balls (not shown) provided between the spindle 2310 and the nut 2320.

One end of the spindle 2310 is coupled to the inside of a rotation preventing unit 2420, which will be described later, through a bearing member (not shown) so as to be rotatably supported, and the other end of the spindle 2310 is coupled to a first regulating member 2510 of the gap regulating unit 2500, which will be described later. That is, the spindle 2310 is connected to the rotor 2100 through the gap regulating unit 2500 and rotates together with the rotor 2100 when the rotor 2100 rotates.

The nut 2320 is configured to move linearly as the spindle 2310 rotates. The structure in which the nut 2320 is prevented from rotating in order to linearly move will be described below again.

When the nut 2320 is moved excessively toward the other end side of the spindle 2310 due to malfunction of the actuator 2000, the first regulating member 2510 coupled with the other end of the nut 2320 or the spindle 2310 may be broken. That is, when the nut 2320 is keep in close contact with the first regulating member 2510 in a surface contact state, the nut 2320 may be locked.

Accordingly, according to an aspect of the present disclosure, a lock preventing unit is provided between the first regulating member 2510 and the nut 2320. Referring to FIG. 7, the lock preventing unit includes a rotation stopper 2513 protruding from the first regulating member 2510 toward the nut 2320, and a fixing stopper 2323 protruding from the nut 2320 toward the first regulating member 2510. An end of the rotation stopper 2513 is provided to be spaced apart from the nut 2320 by a predetermined distance, and an end of the fixing stopper 2323 is provided to be spaced apart from the first regulating member 2510 by a predetermined distance. That is, when the nut 2320 is moved toward the first regulating member 2510 by the rotation of the first regulating member 2510 and the spindle 2310, the rotation stopper 2513 is rotated to contact a side surface of the fixing stopper 2323, thereby restricting the rotation. Accordingly, the first regulating member 2510 and the nut 2320 may be prevented from being excessively pressed and locked.

The piston 2400 is slidably provided in the pressure chamber 2204 so as to pressurize the pressure chamber 2204. Specifically, the piston 2400 is coupled to the nut 2320 such that a portion of the piston 2400 is disposed within the sleeve 2200. That is, the piston 2400 is coupled to the nut 2320 so as to surround an outer side of the spindle 2310 and moves together with the nut 2320. The piston 2400 is provided to be prevented from rotating in order to move forward and backward together with the nut 2320. For example, grooves or protrusions are formed on an inner circumferential surface of the piston 2400 in a longitudinal direction, and the rotation preventing unit 2420 formed with protrusions or grooves corresponding to the grooves or the protrusions formed in the piston 2400 is provided. According to FIG. 7, grooves 2402 are formed in the inner circumferential surface of the piston 2400 and protrusions 2422 are formed in the rotation preventing unit 2420. The rotation preventing unit 2420 is installed in the inside of the sleeve 2200, that is, on the guide wall 2202. The rotation of the piston 2400 is restricted by the engagement of the protrusions 2422 and the grooves 2402. Accordingly, since the rotation of the piston 2400 is prevented, the rotation of the nut 2320 coupled with the piston 2400 is prevented, and thus the nut 2320 moves linearly when the spindle 2310 rotates.

The gap regulating unit 2500 is coupled to the cross-shaped groove 2105 to couple the spindle 2310 and the rotor 2100 and to allow the power conversion unit 2300 to move up, down, left, and right by a certain gap. Specifically, the gap regulating unit 2500 includes the first regulating member 2510 coupled to the spindle 2310 and coupled with upper and lower sides of the cross-shaped groove 2105, a second regulating member 2520 coupled with light and left sides of the cross-shaped groove 2105, and a fastening bolt 2530 penetrating the second regulating member 2520 and the first regulating member 2510 and coupled to the spindle 2310.

The first regulating member 2510 is disposed between the rotor 2510 and the power conversion unit 2300 and coupled to the spindle 2310. The first regulating member 2510 has a disk shape and a coupling hole 2511 is formed at the center thereof to be coupled with the spindle 2310. The coupling hole 2511 has a predetermined length in the left-right direction and may be formed in a non-circular shape to transmit a rotational force to the spindle 2310 when the first regulating member 2510 rotates. A clearance G' is formed between the coupling hole 2511 and the spindle 2310 in the left-right direction. This is for allowing the movement of the power conversion unit 2300 through the gap regulating unit 2500, and the operating state will be described below again.

In addition, the first regulating member 2510 is formed with at least one first protrusion 2515 which is engaged with the upper and lower sides of the cross-shaped groove 2105. Referring to FIG. 8, the at least one first protrusion 2515 is formed as a pair on the surface of the first regulating member 2510 facing the cross-shaped groove 2105. The pair of first protrusions 2515 is formed to have a width corresponding to the cross-shaped groove 2105, and is provided such that a clearance G1 is formed in the left-right direction. That is, when the first regulating member 2510 is coupled to the cross-shaped groove 2105, the first regulating member 2510 is fixed in the left-right direction and is moved by a certain distance in the up-down direction by the clearance G1.

The second regulating member 2520 is disposed on an outer surface of the rotor 2100 and is coupled to the cross-shaped groove 2105. The second regulating member 2520 has a disk shape and a through hole 2521 through which the fastening bolt 2530 passes is formed at a center portion of the second regulating member 2520. The through hole 2521 has a predetermined length in the up-down direction and may be formed in a non-circular shape. Accordingly, a clearance G''' is formed between the through hole 2521 and a body 2531 of the fastening bolt 2530 in the up-down direction. This is for allowing the movement of the power conversion unit 2300 through the gap regulating unit 2500, and the operating state will be described below again.

In addition, the second regulating member 2520 is formed with at least one second protrusion 2525 which is engaged with the left and right sides of the cross-shaped groove 2105. Referring to FIG. 9, the at least one second protrusion 2525 is formed as a pair on the surface of the second regulating member 2520 facing the cross-shaped groove 2105. The pair of second protrusions 2525 is formed to have a width corresponding to the cross-shaped groove 2105, and is provided such that a clearance G2 is formed in the left-right direction. That is, when the second regulating member 2520 is coupled to the cross-shaped groove 2105, the second regulating member 2520 is fixed in the up-down direction and is moved by a certain distance in the left-right direction by the clearance G2.

The fastening bolt 2530 serves to fix the first and second regulating members 2510 and 2520. The fastening bolt 2530 includes the body 2531 which is coupled to the spindle 2310 by passing through the second regulating member 2520, the other side surface of the rotor 2100 and the first regulating member 2510 in order, and a head 2533 extending in the radial direction from an end of the body 2531 to prevent the second regulating member 2520 from being separated. As such, since the fastening bolt 2530 is coupled to the spindle 2310, the fastening bolt 2530 is moved together with the power conversion unit 2300 when the power conversion unit 2300 is moved by a certain gap.

In this embodiment, the cross-shaped groove 2105 is formed on the other side surface of the rotor 2100, and the first protrusion 2515 and the second protrusion 2525 coupled with the cross-shaped groove 2105 are formed on the first regulating member 2510 and the second regulating member 2520, but the present disclosure is not limited thereto. For example, a cross-shaped protrusion may be formed on the other side surface of the rotor 2100, and a first groove and a second groove may be formed on the first regulating member 2510 and the second regulating member 2520, respectively, so as to be engaged with the cross-shaped protrusion.

By virtue of the gap regulating unit 2500, it is possible not only to improve the difficulty in assembling the actuator 2000 due to problems such as dimensional defect and tolerance accumulation, but also to automatically maintain the center of the power conversion unit 2300 when interference occurs between the components during operation of the actuator 2000.

Specifically, in the case where movement in the up-down direction of the power conversion unit 2300 is to be allowed, the movement is allowed by the clearance G1 in the up-down direction by the first regulating member 2510 coupled with the spindle 2310. In this case, since the clearance G'' is formed in the up-down direction of the through hole 2521 of the second regulating member 2520, the fastening bolt 2530 coupled with the spindle 2310 may be moved by a certain gap without restriction of the movement.

In the case where movement in the left-right direction of the power conversion unit 2300 is to be allowed, since the spindle 2310 and the second regulating member 2520 are connected through the fastening bolt 2530, the movement is allowed by the clearance G2 in the left-right direction by the second regulating member 2520. In this case, since the clearance G' is formed in the left-right direction of the coupling hole 2511 of the first regulating member 2510, the spindle 2310 coupled with the first regulating member 2510 may be moved by a certain gap without restriction of the movement.

As described above, since the power conversion unit 2300 is vertically movable through the first regulating member 2510 and is horizontally movable through the second regulating member 2520, it is possible not only to improve the difficulty in assembling the actuator 2000 due to problems such as dimensional defect and tolerance accumulation, but also to automatically maintain the center of the power conversion unit 2300 when interference occurs between the components during operation of the actuator 2000.

As is apparent from the above, the actuator of the electronic brake system according to an embodiment of the present disclosure can provide the hydraulic pressure more quickly and control the pressure increase more precisely by configuring the piston in a double-acting manner.

Further, the actuator of the electronic brake system according to an embodiment of the present disclosure can effectively prevent malfunction due to excessive retreat of the nut by providing the lock preventing unit inside so that the spindle and nut of the power conversion unit are not locked.

Further, the actuator of the electronic brake system according to an embodiment of the present disclosure can effectively reduce the size of the actuator through efficient spatial arrangement by providing the rotation preventing unit for preventing the rotation of the nut during the rotation of the spindle of the power conversion unit.

Further, the actuator of the electronic brake system according to an embodiment of the present disclosure can improve the detection capability of the motor position sensor and reduce the size of the actuator through efficient spatial arrangement by mounting the sensing magnet for detecting a rotational position of the motor to an end of the power conversion unit and by disposing the motor position sensor coaxially with the corresponding electronic control unit spaced apart from the sensing magnet.

Further, the actuator of the electronic brake system according to an embodiment of the present disclosure can automatically maintain a center by moving the power conversion unit in the up, down, left, and right directions by a certain gap with the gap regulating unit, thereby increasing the durability of the actuator, improving the assemblability, and reducing the noise.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:
1. An actuator of an electronic brake system comprising:
  a motor having a stator and a rotor for generating a rotational force by an electrical signal, the rotor having an accommodating space therein;
  a power conversion unit disposed in the accommodating space, and including a spindle rotated by a rotational force of the rotor and a nut coupled to the spindle to be linearly moved by rotation of the spindle;
a piston coupled to move with the nut;
a sleeve coupled to one end of the rotor by a bearing so that the rotor is relatively rotatable and having an inner space communicating with the accommodating space and accommodating the piston so as to be able to move forward and backward; and
a disk provided inside the accommodating space of the rotor, a first protrusion protruding from the disk, and a second protrusion provided on a side of the nut facing the disk, to prevent the rotation of the spindle and the nut from being locked.

2. The actuator of an electronic brake system according to claim 1,
further comprising: a piston housing containing a fluid therein and having a pressure chamber enclosing a sleeve in which the piston is accommodated so as to be movable forward and backward,
wherein the power conversion unit is provided in a space formed by the accommodating space of the rotor and the pressure chamber.

3. The actuator of an electronic brake system according to claim 1,
wherein the power conversion unit includes a fixing pin coupled to the rotor and rotating together with the rotor, a spindle connected to the fixing pin and rotating together with the fixing pin, and a nut screwed to the spindle, and
the nut is fixedly coupled to the piston.

4. The actuator of an electronic brake system according to claim 1,
further comprising: a piston housing containing a fluid therein and having a pressure chamber enclosing a sleeve in which the piston is accommodated so as to be movable forward and backward,
wherein the piston includes a piston rod coupled nut and slidably moving in the pressure chamber.

5. The actuator of an electronic brake system according to claim 4,
wherein the piston rod includes a rotation preventing unit, and
the rotation preventing unit includes a cylindrical piston sleeve provided on an inner surface of the piston rod, at least one rail provided along a longitudinal direction on the piston sleeve, and a rotation preventing ring having at least one guide protrusion fitted to the at least one rail to move forward and backward along the longitudinal direction of the piston sleeve.

6. The actuator of an electronic brake system according to claim 4,
further comprising: a sensing magnet coupled to the power conversion unit and rotated together with the rotation of the motor; and
a motor position sensor provided to be coaxially spaced apart from the sensing magnet and sense a rotational position of the motor based on rotation of the sensing magnet.

7. The actuator of an electronic brake system according to claim 1,
further comprising: a piston housing containing a fluid therein and having a pressure chamber in which the piston is accommodated so as to be movable forward and backward,
wherein the pressure chamber is divided into a first chamber and a second chamber by the piston.

8. The actuator of an electronic brake system according to claim 1,
wherein the rotor is opened at one end and has a cross-shaped groove or a protrusion at the other end, and
the actuator further comprises a gap regulating unit coupling the spindle and the rotor through the cross-shaped groove or the protrusion of the rotor and allowing the power conversion unit to move up, down, left, and right by a certain gap.

9. The actuator of an electronic brake system according to claim 8,
wherein the gap regulating unit includes:
a first regulating member coupled with upper and lower sides of the cross-shaped groove or the projection so as to be coupled with the spindle between the rotor and the power conversion unit and to be moved in the up-down direction by a certain gap but to be fixed in the left-right direction;
a second regulating member coupled to left and right sides of the cross-shaped groove or the protrusion so as to be moved in the left-right direction by a certain gap but to be fixed in the up-down direction; and
a fastening bolt coupled to the spindle by passing through the first regulating member and the second regulating member.

10. The actuator of an electronic brake system according to claim 9,
wherein a coupling hole through which the spindle is coupled is formed in the center of the first regulating member, and
the coupling hole has a predetermined length in the left-right direction d in a non-circular shape.

11. The actuator of an electronic brake system according to claim 9,
wherein a first protrusion or a first groove is formed on upper and lower sides with respect to the center of the first regulating member so as to be engaged with the cross-shaped groove or the protrusion, and
a clearance is formed in the up-down direction between the first protrusion or the first groove and the cross-shaped groove or the protrusion.

12. The actuator of an electronic brake system according to claim 9,
wherein a second protrusion or a second groove is formed on left and right sides with respect to the center of the second regulating member so as to be engaged with the cross-shaped groove or the protrusion, and
a clearance is formed in the left-right direction between the second protrusion or the second groove and the cross-shaped groove or the protrusion.

13. The actuator of an electronic brake system according to claim 1,
wherein a groove or a protrusion is formed on an inner circumferential surface of the piston in a longitudinal direction, and
the actuator further comprises a rotation preventing unit installed inside the sleeve and having a protrusion or a groove corresponding to the groove or the protrusion.

14. An actuator of an electronic brake system comprising:
a motor having a stator and a rotor for generating a rotational force by an electrical signal, the rotor having an accommodating space therein;
a power conversion unit disposed in the accommodating space, and including a spindle rotated by a rotational force of the rotor and a nut coupled to the spindle to be linearly moved by rotation of the spindle;
a piston coupled to move with the nut; and a sleeve coupled to one end of the rotor by a bearing so that the rotor is relatively rotatable and having an inner space communicating with the accommodating space and accommodating the piston so as to be able to move forward and backward, wherein the rotor is opened at one end and has a cross-shaped groove or a protrusion at the other end, wherein the actuator further comprises a gap regulating unit coupling the spindle and the rotor through the cross-shaped groove or the protrusion of the rotor and allowing the power conversion unit to move up, down, left, and right by a certain gap, wherein the gap regulating unit includes a regulating member coupled with upper and lower sides of the cross-shaped groove or the projection so as to be coupled with the spindle between the rotor and the power conversion unit and to be moved in the up-down direction by a certain gap and to be fixed in the left-right direction, wherein a coupling hole through which the spindle is coupled is formed in the center of the regulating member, and the coupling hole has a predetermined length in the left-right direction and is formed in a non-circular shape, and wherein a clearance is formed in the left-right direction between the coupling hole and the spindle.

15. An actuator of an electronic brake system comprising:

a motor having a stator and a rotor for generating a rotational force by an electrical signal, the rotor having an accommodating space therein;

a power conversion unit disposed in the accommodating space, and including a spindle rotated by a rotational force of the rotor and a nut coupled to the spindle to be linearly moved by rotation of the spindle;

a piston coupled to move with the nut; and a sleeve coupled to one end of the rotor by a bearing so that the rotor is relatively rotatable and having an inner space communicating with the accommodating space and accommodating the piston so as to be able to move forward and backward, wherein the rotor is opened at one end and has a cross-shaped groove or a protrusion at the other end, wherein the actuator further comprises a gap regulating unit coupling the spindle and the rotor through the cross-shaped groove or the protrusion of the rotor and allowing the power conversion unit to move up, down, left, and right by a certain gap, wherein the gap regulating unit includes: a first regulating member coupled with upper and lower sides of the cross-shaped groove or the projection so as to be coupled with the spindle between the rotor and the power conversion unit and to be moved in the up-down direction by a certain gap but to be fixed in the left-right direction; a second regulating member coupled to left and right sides of the cross-shaped groove or the protrusion so as to be moved in the left-right direction by a certain gap but to be fixed in the up-down direction; and a fastening bolt coupled to the spindle by passing through the first regulating member and the second regulating member, and wherein a through hole through which the fastening bolt passes is formed in the center of the second regulating member, and the through hole has a predetermined length in the up-down direction and is formed in a non-circular shape.

16. The actuator of an electronic brake system according to claim 14, wherein a clearance is formed in the up-down direction between the through hole and the fastening bolt.

\* \* \* \* \*